United States Patent [19]
Knight et al.

[11] Patent Number: 5,638,698
[45] Date of Patent: Jun. 17, 1997

[54] CRYOGENIC SYSTEM FOR PRODUCING NITROGEN

[75] Inventors: Mary Anne Knight, Tonawanda; James Joseph Maloney, Amherst, both of N.Y.

[73] Assignee: Praxair Technology, Inc., Danbury, Conn.

[21] Appl. No.: 701,372

[22] Filed: Aug. 22, 1996

[51] Int. Cl.⁶ .................................................. F25J 3/08
[52] U.S. Cl. ............................ 62/632; 62/913; 62/927
[58] Field of Search ........................... 62/632, 913, 927, 62/48.2

[56] References Cited

U.S. PATENT DOCUMENTS

| | | | |
|---|---|---|---|
| 2,926,501 | 3/1960 | Morrison | 62/913 X |
| 4,017,283 | 4/1977 | Witt | 62/913 X |
| 4,188,793 | 2/1980 | Watson et al. | 62/50.1 |
| 4,424,680 | 1/1984 | Rothchild | 62/632 X |
| 4,551,981 | 11/1985 | Banerjee | 62/70 |
| 4,575,387 | 3/1986 | Larue et al. | 62/632 |
| 4,769,054 | 9/1988 | Steigman . | |
| 4,948,404 | 8/1990 | Delong | 62/927 X |
| 5,076,822 | 12/1991 | Hewitt | 62/632 |
| 5,214,924 | 6/1993 | Karthaus et al. | 62/913 X |
| 5,220,796 | 6/1993 | Kearns . | |
| 5,231,772 | 8/1993 | Hermanns et al. | 34/26 |
| 5,291,738 | 3/1994 | Waldrop . | |
| 5,339,641 | 8/1994 | Mathis et al. | 62/927 X |
| 5,367,882 | 11/1994 | Lievens et al. | 62/48.2 |
| 5,390,499 | 2/1995 | Rhoades et al. | 62/632 X |
| 5,450,728 | 9/1995 | Vora et al. . | |
| 5,502,969 | 4/1996 | Jin et al. . | |
| 5,540,057 | 7/1996 | Cheng | 62/632 X |

*Primary Examiner*—Christopher Kilner
*Attorney, Agent, or Firm*—Stanley Ktorides

[57] ABSTRACT

A system for processing nitrogen-containing effluent from an industrial process wherein the effluent is cooled and liquid nitrogen is added directly to the cooled effluent. The direct contact and heat exchange produces gaseous nitrogen and liquid organics which are both used to cool the effluent and are subsequently recovered.

9 Claims, 1 Drawing Sheet

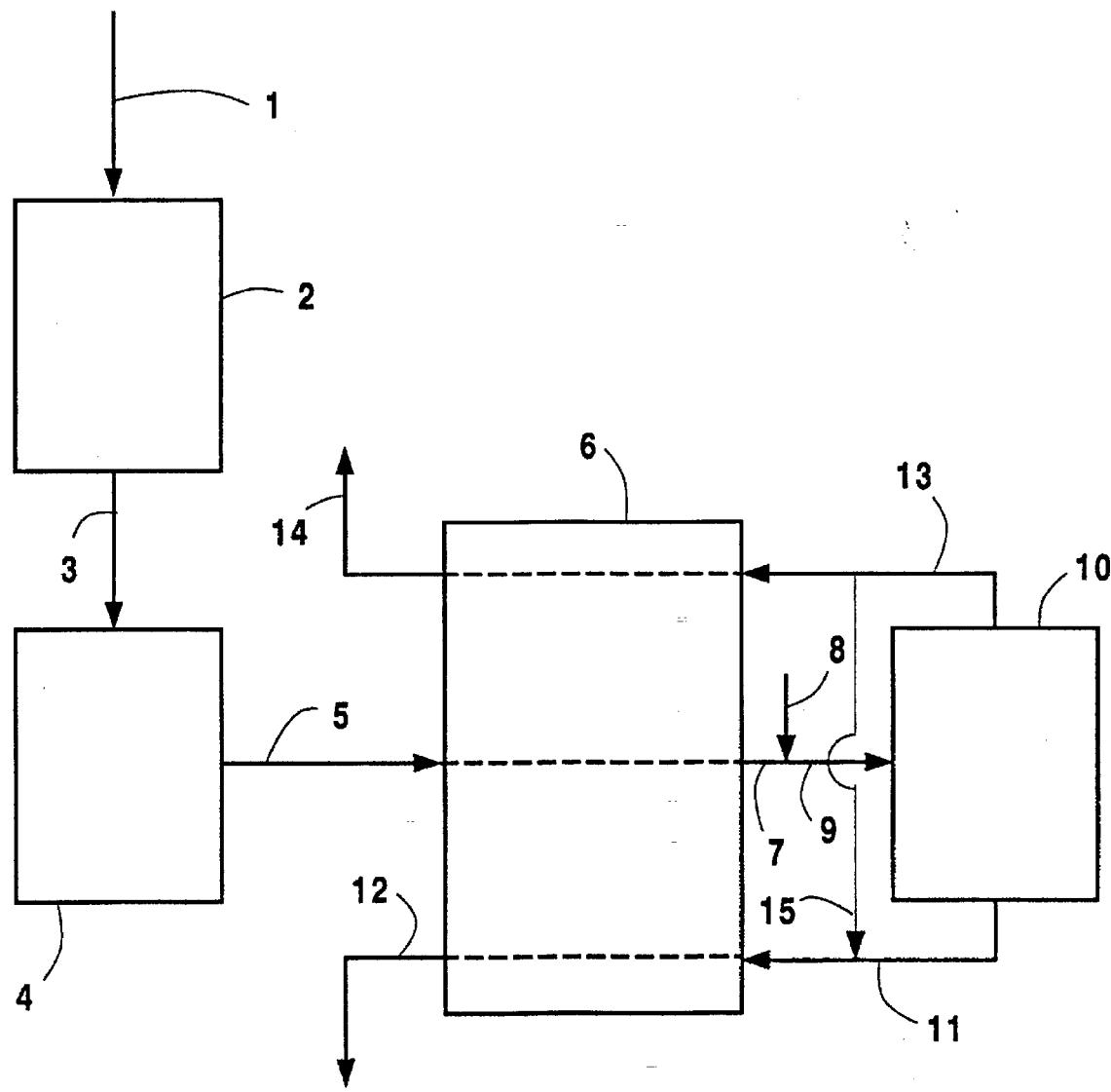

5,638,698

CRYOGENIC SYSTEM FOR PRODUCING NITROGEN

TECHNICAL FIELD

This invention relates generally to the production of nitrogen and more particularly to the production of nitrogen by the processing of an effluent stream.

BACKGROUND ART

Nitrogen is used extensively in many industrial processes for blanketing storage vessels, reactors and the like, as an inerting atmosphere, for drying, and for other uses. Typically the nitrogen is then vented to the atmosphere. Sometimes, when the used nitrogen has picked up a significant amount of impurities such as volatile organic compounds, the nitrogen is processed to recover the impurities for economic and/or environmental reasons.

Nitrogen is generally produced by separating air into its constituent parts. When an industrial user has a new or expanded nitrogen requirement, it may not be economically attractive to construct a new air separation plant or storage facility, or expand the capacity of the existing air separation plant or storage facility, to address the new or expanded requirement. In such instances it would be desirable to be able to produce nitrogen from the effluent of the industrial use.

Accordingly it is an object of this invention to provide a system for producing nitrogen which can be economically and effectively integrated with a facility which uses nitrogen for blanketing or other purposes.

SUMMARY OF THE INVENTION

The above and other objects, which will become apparent to those skilled in the art upon a reading of this disclosure, are attained by the present invention, one aspect of which is:

A method for producing nitrogen comprising:

(A) cooling a feed gas stream comprising nitrogen and at least one volatile organic compound to produce a cooled gas stream;

(B) adding liquid nitrogen to the cooled gas stream and vaporizing said liquid nitrogen by direct heat exchange with said cooled gas stream to produce gaseous nitrogen and liquid volatile organic compound(s);

(C) passing said liquid volatile organic compound(s) in indirect heat exchange with said feed gas stream and passing said gaseous nitrogen in indirect heat exchange with said feed gas stream to produce said cooled gas stream and to produce warmed gaseous nitrogen; and (D) recovering said warmed gaseous nitrogen as product nitrogen.

Another aspect of the invention is:

Apparatus for producing nitrogen comprising:

(A) a heat exchanger, means for providing feed gas comprising nitrogen and at least one volatile organic compound into said heat exchanger, and means for withdrawing cooled feed gas from said heat exchanger;

(B) a phase separator, means for adding liquid nitrogen to said cooled feed gas to produce a two-phase stream, and means for passing said two-phase stream into said phase separator;

(C) means for passing liquid from said phase separator to said heat exchanger, and means for passing vapor from said phase separator to said heat exchanger; and (D) means for recovering vapor from said heat exchanger as product nitrogen.

As used herein the term "indirect heat exchange" means the bringing of two fluid streams into heat exchange relation without any physical contact or intermixing of the fluids.

As used herein the term "direct heat exchange" means the bringing of two fluid streams into heat exchange relation with physical contact and/or intermixing of the fluids.

As used herein the term "liquid nitrogen" means a liquid having a nitrogen concentration of at least 99 mole percent and preferably having an oxygen concentration of less than 10 ppm.

As used herein, the term "phase separator" means a device in which a two-phase fluid separates into a vapor and liquid at the vapor side and the liquid side respectively.

As used herein, the term "volatile organic compound" means a hydrocarbon such as propane, butane, butylene, pentane, hexane and the like which may be generated during production or processing of chemicals, polymers or other such industrial products.

BRIEF DESCRIPTION OF THE DRAWING

The sole FIGURE is a simplified schematic representation of one particularly preferred embodiment of the cryogenic nitrogen production system of this invention.

DETAILED DESCRIPTION

The invention employs cryogenic liquid nitrogen to intermix with effluent from an industrial process. The direct contact condenses volatile organic compounds in the effluent while the liquid nitrogen boils. The boiling action coupled with the direct contact keeps the condensing volatile organic compounds from solidifying or freezing thus enabling efficient recovery and reuse of both the volatile organics and the nitrogen.

The invention will be described in greater detail with reference to the drawing.

Referring now to the Figure, feed gas stream 1, comprising nitrogen and at least one volatile organic compound, is passed to compressor 2 wherein it is compressed to a pressure within the range of from about 20 to 350 pounds per square inch absolute (psia). The invention may be practiced without the compression of the feed gas stream; however, the compression of the feed gas stream improves the subsequent fluid flow and heat transfer of the invention.

Feed gas stream 1 has a nitrogen concentration generally within the range of from 95 to 99.5 mole percent. Generally stream 1 is effluent taken from an industrial process or facility wherein the nitrogen has been used for blanketing, inerting, drying, etc. and has picked up volatile organic compounds in the course of such usage. Typical industrial processes which will benefit from the use of this invention include chemical manufacturing and hydrocarbon processing. Among the many volatile organic compounds which may be employed in the practice of this invention one can name propane, propylene, butane, butylene, pentane, hexane, i-hexane and the like.

Compressed feed gas stream 3 is passed from compressor 2 to dryer 4 to remove water from the gas stream. The use of the drying step is not necessary for the practice of the invention but is preferred because water vapor in the gas stream will burden the subsequent heat exchange of the invention. Dryer 4 is typically a molecular sieve unit designed to remove water vapor from the incoming feed gas stream. The molecular sieve material may be regenerated using warm feed gas or a utility nitrogen stream to remove water from the sieve material.

Dried feed gas stream 5, generally comprising less than 1 part per million (ppm) water vapor, is passed from dryer 4 to heat exchanger 6 wherein it is cooled by indirect heat exchange with return streams as will be more fully described later. Generally some of the volatile organic material within stream 5 will condense as this stream is cooled within heat exchanger 6. The cooling of the feed gas stream within heat exchanger 6 does not result in any substantial solidification or freezing of the volatile organic compounds onto the heat exchange passages. This enables the cooling within heat exchanger 6 to proceed in a highly efficient mode both in terms of heat transfer and in terms of operation of the heat exchanger.

Cooled feed gas, generally at a temperature within the range of from −100° F. to −260° F. and generally containing volatile organic compounds in liquid form, is withdrawn from heat exchanger 6 in conduit or stream 7. Liquid nitrogen 8 is added to cooled feed gas 7. The direct contact of the liquid nitrogen with the cooled feed gas and the consequent direct heat transfer causes gaseous volatile organic compounds within the cooled gas to condense while the liquid nitrogen vaporizes or boils. The amount of liquid nitrogen 8 added to cooled feed gas stream 7 is controlled to ensure that there is substantially no solidification of the volatile organic compounds. The flow of the cooled feed gas stream and the vigorous boiling action of the liquid nitrogen in direct contact with the cooled gas stream also serve to avoid solidification of the volatile organic compounds. Because of the cooling of the feed gas stream prior to contact with the liquid nitrogen, the direct contact of the liquid nitrogen with the cooled gas stream, and because solidification of the volatile organic compounds is not required, relatively little liquid nitrogen is needed to carry out the process of the invention. For a feed gas containing 0.5 weight percent volatile organic compounds, typically there is used a ratio of 1 pound of liquid nitrogen for every 40 pounds of feed gas. In the practice of this invention this ratio of liquid nitrogen to feed gas may range from about 1 to 20 to about 1 to 100.

The admixture of liquid nitrogen 8 and cooled feed gas stream 7 produces two-phase stream 9 comprising gaseous nitrogen and liquid volatile organic compound(s). Two-phase stream 9 is passed into phase separator 10 wherein it is separated into gaseous nitrogen and liquid volatile organic compound(s). The liquid volatile organic compounds are withdrawn from the liquid side of phase separator 10 in stream 11 and passed through heat exchanger 6 to carry out the aforedescribed cooling of feed gas stream 5. Resulting warmed volatile organic compound stream 12 is withdrawn from heat exchanger 6 and, if desired, may be recovered. If stream 12 contains more than one specie of volatile organic compound, it may be passed to a separation system in order to recover separately the volatile organic compounds which comprise stream 12. Stream 12 may be entirely liquid when it is withdrawn from heat exchanger 6, or it may be entirely or partly vapor at that point.

Gaseous nitrogen is withdrawn from the vapor side of phase separator 20 in stream 13 and passed through heat exchanger 6 to further carry out the aforedescribed cooling of feed gas stream 5. Stream 13 comprises nitrogen from stream 1 and nitrogen from stream 8. Resulting warmed gaseous nitrogen stream 14 is recovered as product nitrogen having a nitrogen concentration generally greater than 99 mole percent. The product nitrogen may then be reused in the industrial process or facility from which feed gas stream 1 was taken.

Stream 11 which is passed into heat exchanger 6 has a very low frictional pressure drop despite the use of minimal heat exchanger passages for this stream. This could lead to distillation within the heat exchanger and result in a concentration of heavy hydrocarbons in the cold end of the heat exchanger. Under such conditions, boiling within heat exchanger 6 could become very unstable. To address this concern, it is preferred that some gaseous nitrogen, such as from stream 13 in bypass vapor line 15, be passed into stream 11 upstream of heat exchanger 6 to help assure continuous boiling of this stream within heat exchanger 6.

In some situations it may be desirable to fractionally distill the cooled feed gas stream. In such situations a distillation column would be used in place of the phase separator. The cooled feed gas is passed directly into the distillation column and liquid nitrogen is introduced into the upper portion of the distillation column. Gaseous nitrogen and liquid volatile organic compounds are withdrawn from the upper portion or lower portion respectively of the distillation column.

Now by the use of this invention, one can effectively cryogenically process an effluent stream to produce nitrogen gas product. Although the invention has been described in detail with reference to a certain preferred embodiment, those skilled in the art will recognize that there are other embodiments of the invention within the spirit and the scope of the claims.

We claim:

1. A method for producing nitrogen comprising:
   (A) cooling a feed gas stream comprising nitrogen and at least one volatile organic compound to produce a cooled gas stream;
   (B) adding liquid nitrogen to the cooled gas stream and vaporizing said liquid nitrogen by direct heat exchange with said cooled gas stream to produce gaseous nitrogen and liquid volatile organic compound(s);
   (C) passing said liquid volatile organic compound(s) in indirect heat exchange with said feed gas stream and passing said gaseous nitrogen in indirect heat exchange with said feed gas stream to produce said cooled gas stream and to produce warmed gaseous nitrogen; and
   (D) recovering said warmed gaseous nitrogen as product nitrogen.

2. The method of claim 1 wherein some of the feed gas stream is condensed during said cooling.

3. The method of claim 1 wherein some gaseous nitrogen is passed into the liquid volatile organic compound(s) prior to passing said liquid volatile organic compound(s) in indirect heat exchange within said feed gas stream.

4. The method of claim 1 further comprising compressing the feed gas stream prior to said cooling.

5. The method of claim 1 further comprising drying the feed gas stream prior to said cooling.

6. Apparatus for producing nitrogen comprising:
   (A) a heat exchanger, means for providing feed gas comprising nitrogen and at least one volatile organic compound into said heat exchanger, and means for withdrawing cooled feed gas from said heat exchanger;

(B) a phase separator, means for adding liquid nitrogen to said cooled feed gas to produce a two-phase stream, and means for passing said two-phase stream into said phase separator;

(C) means for passing liquid from said phase separator to said heat exchanger, and means for passing vapor from said phase separator to said heat exchanger; and (D) means for recovering vapor from said heat exchanger as product nitrogen.

7. The apparatus of claim 6 further comprising means for passing vapor from said phase separator into the means for passing liquid from said phase separator to said heat exchanger.

8. The apparatus of claim 6 further comprising a compressor and means for passing compressed feed gas from the compressor to the heat exchanger.

9. The apparatus of claim 6 further comprising a dryer and means for passing dried feed gas from the dryer to the heat exchanger.

* * * * *